United States Patent

Alvin et al.

[11] Patent Number: 6,123,746
[45] Date of Patent: Sep. 26, 2000

[54] FILTER HOLDER AND GASKET ASSEMBLY FOR CANDLE TUBE FILTERS

[75] Inventors: Marry Anne Alvin, Pgh, Pa.; Thomas K. Atkian, Lyndhurst, Ohio

[73] Assignee: Siemens Westinghouse Power Corporation, Orlando, Fla.

[21] Appl. No.: 09/263,436

[22] Filed: Mar. 4, 1999

[51] Int. Cl.[7] .................................. B01D 29/13
[52] U.S. Cl. .................. 55/502; 55/341.1; 55/378; 55/484; 55/508; 55/523; 277/633
[58] Field of Search ................. 55/341.1, 378, 55/484, 502, 508, 523; 277/528, 529, 633, 644, 610, 910

[56] References Cited

U.S. PATENT DOCUMENTS

| | | | |
|---|---|---|---|
| Re. 29,702 | 7/1978 | Owen et al. | 277/633 |
| 4,436,536 | 3/1984 | Robinson | 55/502 |
| 5,110,332 | 5/1992 | Isaksson | 55/502 |
| 5,185,019 | 2/1993 | Haldipur et al. | |
| 5,474,586 | 12/1995 | Eaton et al. | |
| 5,620,505 | 4/1997 | Koch et al. | 55/502 |
| 5,720,790 | 2/1998 | Kometani et al. | 55/502 |
| 5,797,604 | 8/1998 | Inagaki et al. | 277/633 |
| 5,876,471 | 3/1999 | Lippert et al. | |

*Primary Examiner*—David A. Simmons
*Assistant Examiner*—Minh-Chau T. Pham

[57] ABSTRACT

A candle filter holder and gasket assembly for holding a candle filter element within a hot gas cleanup system pressure vessel contians a filter housing (62), a candle filter attached to the filter housing and at least one associated gasket (74) and/or (76) where at least the one associated gasket has a construction that is selected from a single end rolled single spiral (75) or a two end rolled double spiral (71), both constructions having no separate center element and where the at least one gasket (74) and/or (76) functions to provide a seal between filtered gas and dirty or contaminated unfiltered gas within the gas cleanup system.

14 Claims, 6 Drawing Sheets

FILTER HOLDER AND GASKET ASSEMBLY FOR CANDLE TUBE FILTERS

BACKGROUND OF THE INVENTION

1. Field of the Invention

This invention relates generally to hot-gas cleanup systems and more particularly to a gasket assembly that provides a particulate barrier seal between the body of a candle filter element and the filter holder.

2. Background Information

Modern industrial methods have resulted in a need for an apparatus that is capable of efficiently filtering high temperature combustion gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. As another example, in conventional boiler operations, the boilers undergo routine shutdown for cleaning the fireside surfaces and for inspection. An efficient hot gas filtering system would greatly extend the life and operational time for a boiler to operate between inspections. Fouling of the fireside surface due to ash deposition and corrosion would be eliminated or minimized.

U.S. Pat. No. 5,185,019 discloses a thick walled hot gas candle filter mounting assembly. U.S. Pat. No. 5,474,586 discloses a thin walled hot gas candle filter mounting assembly, and discusses gasket assemblies generally, providing little information as to their construction.

Additionally, U.S. Ser. No. 08/636,432, filed on Apr. 23, 1996 (Alvin et al.), attempted to provide a filtering apparatus that can filter high temperature, high pressure, aggressive gases, having an improved, easily mounted double gasket assembly that can be employed with a conventional candle filter and a thin walled composite. There, both the topmost and bottom gaskets consisted of a two component system, made of an interior ceramic fibrous mat filler in compliant annular form covered by a short sheet of a woven or braided sleeving surrounding or encasing the mat filler, which sleeving was stitched together on the outside diameter of the gasket.

Operational experiences show that the prior two component gaskets were subject to fraying and loss of the central mat filler. This could leave, in the case of the top gasket, a void between the metal retainer ring and the top of the porous ceramic and/or metal candle filter, whereby racheting of the candle filter within the housing may cause failure of the candle filter and/or passage of particulate fines into the clean gas stream. This two component system also requires specialty cutting of the interior mat to tolerance specifications. The plurality of gaskets were employed to provide cushioning and sealing around a filter element to prevent particulate matter from passing between the filter body and its associated metal housing. A cast nut was provided as a coupling means to secure the assembled housing, filter element and gaskets.

In view of the above problems, what is needed is a different type of gasket assembly which is less expensive and less complicated to manufacture, which will be less likely to separate, and which if it does start to separate will retain the spacing and seal between metal retainer ring, metal housing, and the ceramic and/or porous metal candle filter.

SUMMARY OF THE INVENTION

Therefore, it is a main object of this invention to provide an improved compliant gasket, providing a seal between the porous ceramic, metal, or intermetallic filter and the filter holder.

These and other objects are accomplished by providing a candle filter holder and gasket assembly for holding a candle filter element within a hot gas cleanup system pressure vessel, the filter element including a body having two opposing ends, one defining a flange open end and the other defining a closed end; the filter element body having a smaller inner diameter surface and a larger outer diameter surface, said candle filter holder and gasket assembly comprising:

a. a filter housing, said filter housing having a peripheral sidewall, said sidewall defining an interior chamber;

b. at least one compliant gasket separate and apart from the filter housing, said compliant gasket positioned next to the filter element and effective to provide a seal between filtered gas and unfiltered gas and to cushion the filter element; and c. means for coupling the filter element, and filter housing, and gasket within the pressure vessel; where the improvement comprises, the at least one compliant gasket, has a construction that consists of (1) a single element made of a braided or woven sheet or sleeving rolled within itself to form a configuration selected from a single end rolled single spiral or (2) a two end rolled double spiral, both constructions with no separate center element.

DESCRIPTION OF THE PREFERRED EMBODIMENTS

Figure 1:
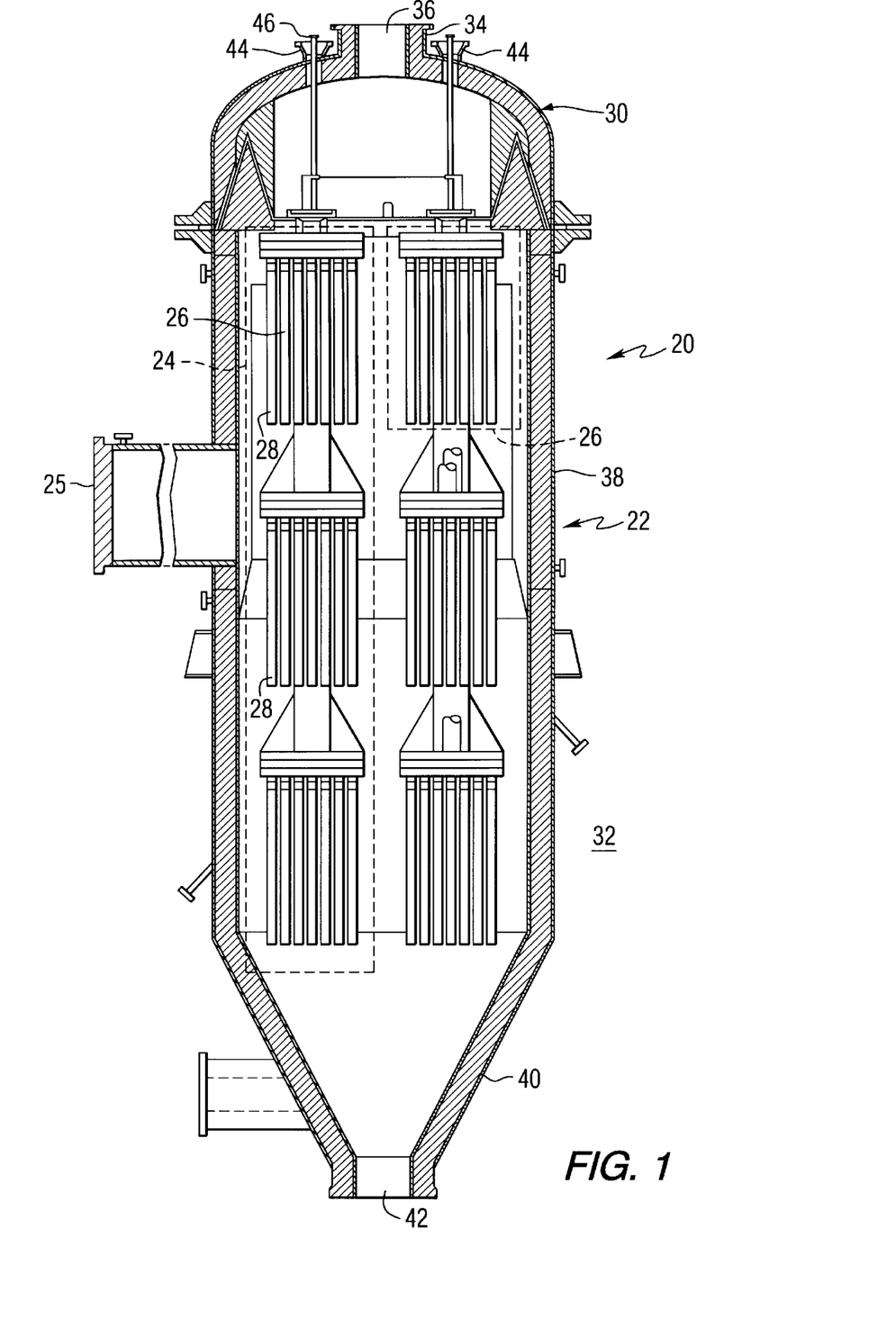
FIG. 1 is a longitudinal section view of a pressure vessel incorporating the filter holder and gasket assembly in accordance with the present invention.

FIG. 1 shows a filtering apparatus 20 for separating particulate matter from a gas stream. This apparatus includes a pressure vessel 22 in which there are mounted a plurality of clusters 24 comprising a plurality of filter element arrays 26. These filter element arrays 26 include a plurality of "candle filter elements" 28.

The pressure vessel 22 has a dome-shaped head 30 and a body 32. The dome-shaped head 30 terminates in a linear tip 34, defining an exit opening or nozzle 36 for the filtered gas to be removed from the vessel 22. The body 32 includes a dirty gas inlet 25, an upper part 38 having a generally circular cylindrical shape joined by a frusto-conical ash hopper 40 for receiving the particulate matter terminating in a linear tip defining an opening or nozzle 42 connected to an ash discharge line. A plurality of ports 44 extend from the dome-shaped head 30. The ports 44 provide a site for inserting instrumentation and for viewing the interior of the dome-shaped head 30 during shut-down periods. Through each port, tubes 46 for supplying a back pulse burst of gas for cleaning the candle filters 28 can be placed.

Figure 2:
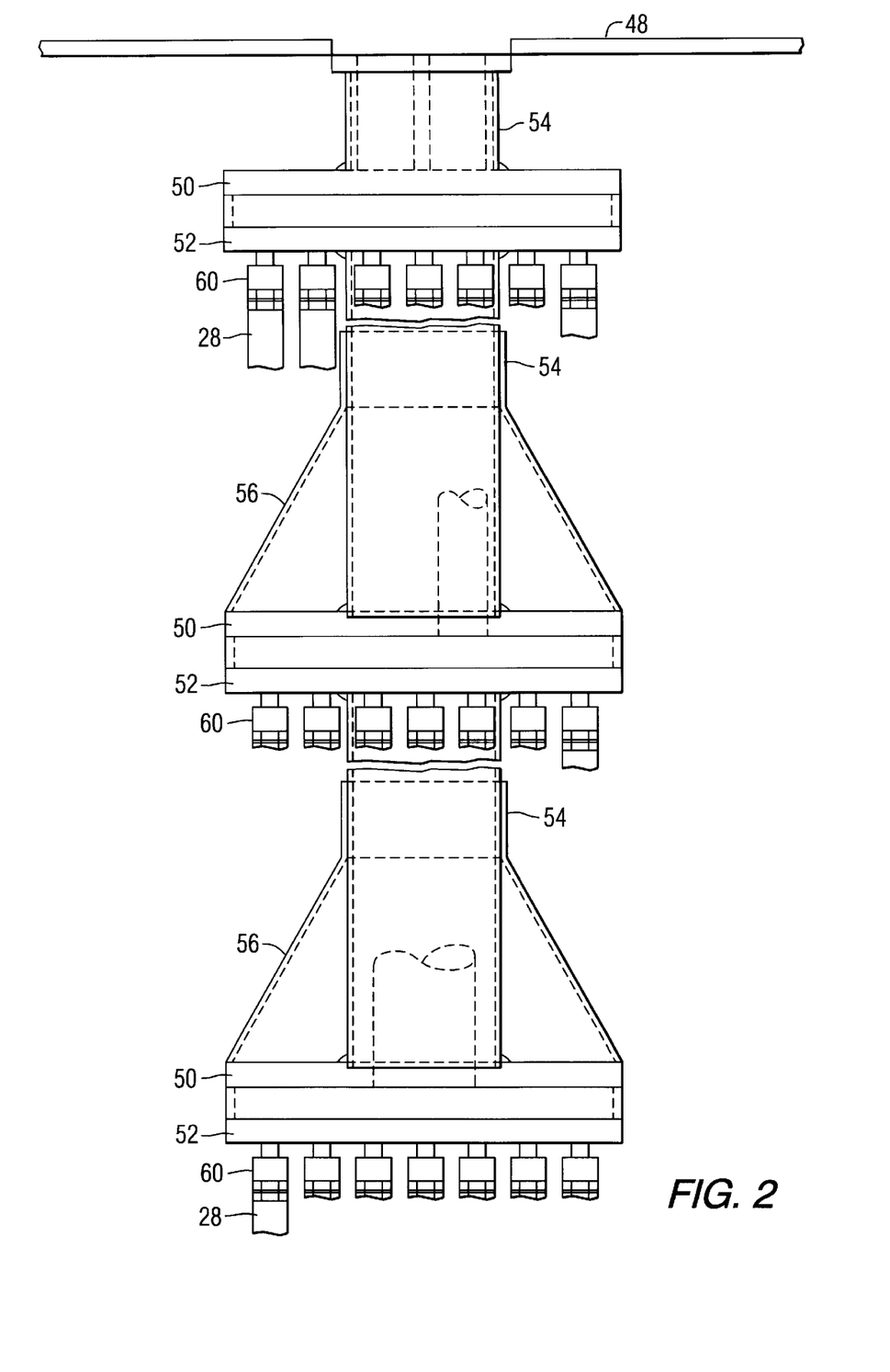
FIG. 2 is a side elevation view of an array of filter elements coupled to a tube sheet as shown in FIG. 1.

Referring to FIG. 2, the pressure vessel includes a tube sheet 48. Each tube sheet 48 comprises an upper plate 50 and a lower plate 52. In accordance with the present invention, each filter element 28 is held within a filter holder and gasket assembly 60 and coupled to the corresponding lower plate 52 of the tube sheet 48. The filter elements 28 are integrated into a structural unit by plenum support pipes 54. Each plenum support pipe 54 is secured centrally (coaxially) within the pressure vessel 22. A dust shed or particle-deflector 56 having a generally frusto-conical shape is attached above each tube sheet 48.

Figure 3:
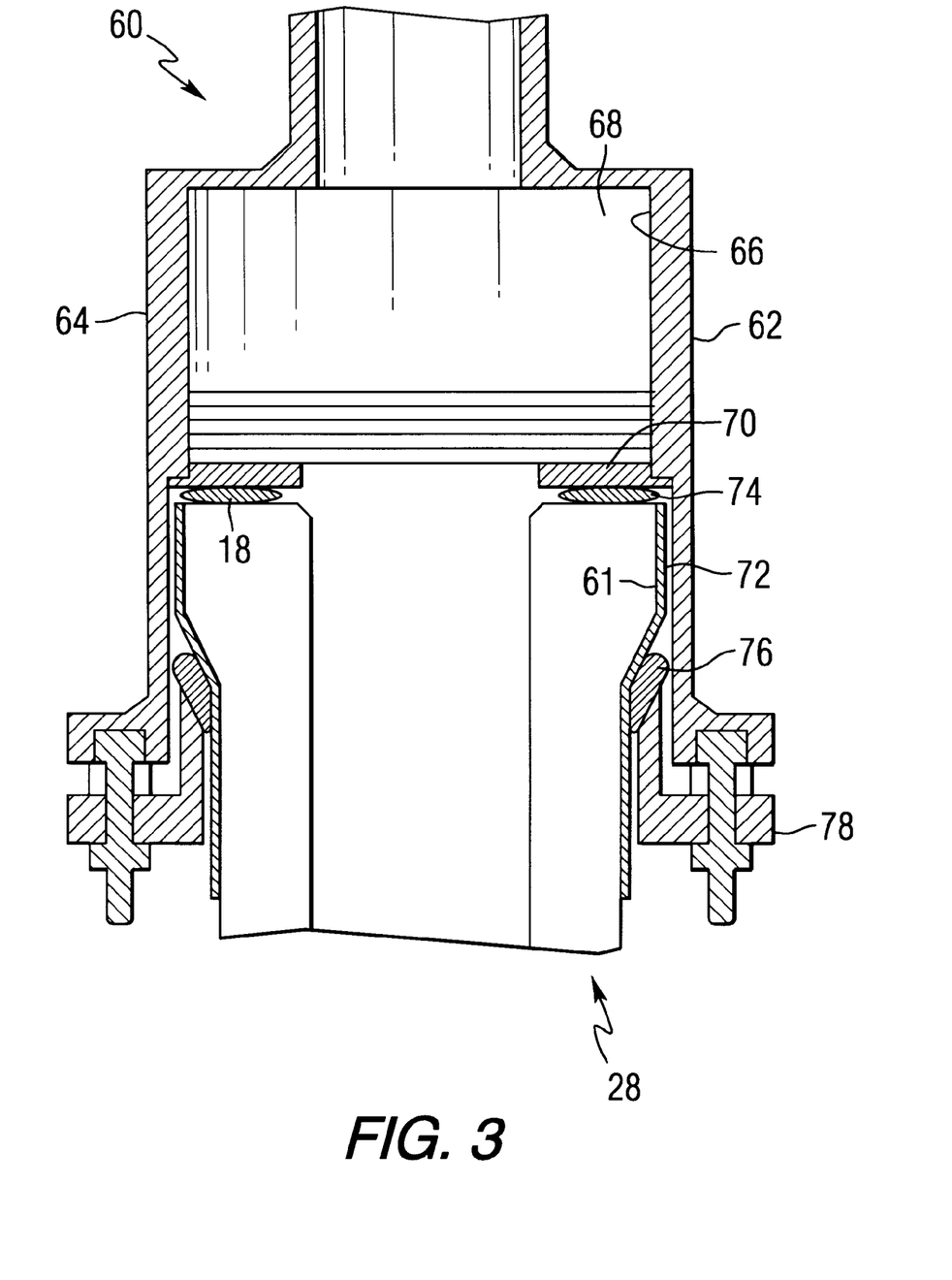
FIG. 3 is a sectional view of a filter holder and gasket assembly in accordance with the present invention employed with a conventional monolithic thick-walled hollow candle filter.
Figure 4A:
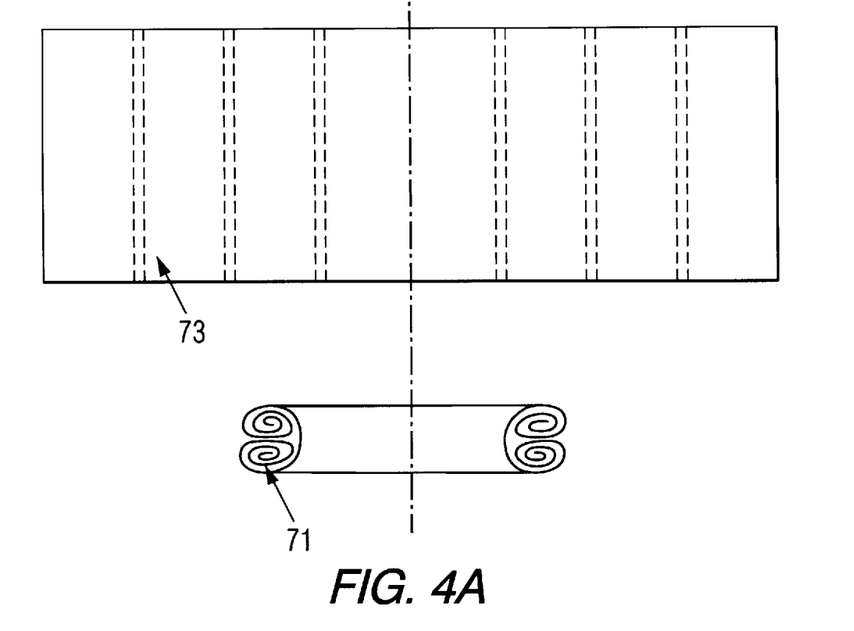
FIG. 4A is a section view of one embodiment of the single component gasket of the invention.
Figure 4B:
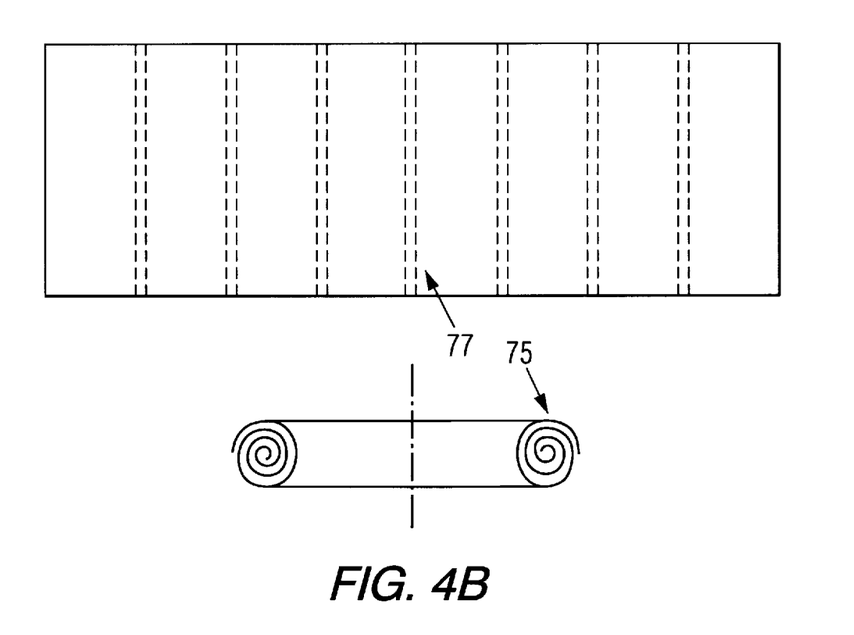
FIG. 4B is a section view of a second embodiment of the single component gasket of this invention.

The preferred filter holder and gasket assembly 60 of the present invention for use with a conventional thick-wall hollow tube monolithic ceramic and/or porous metal candle filter 28, will now be described. Referring to FIGS. 3 and 4, the filter holder and gasket assembly 60 provides a particulate barrier seal between the clean gas and dirty gas surfaces of the filter element 28. In FIG. 3, the filter holder and gasket assembly 60 is shown assembled. The filter holder and gasket assembly 60 comprises a filter housing 62 having a peripheral sidewall 64 which defines an interior chamber 66, a fail-safe/regenerator device 68, permanently or removably installed within the interior chamber 66, an annular spacer ring 70 permanently or removably installed within the interior chamber 66, a gasket sock or sleeve 72, a top or topmost compliant gasket 74, usually a bottom or bottommost compliant gasket 76, and a cast nut 78 providing a coupling means.

Preferably the spacer ring 70 is permanently mounted to the fail-safe/regenerator to produce a single unit that is placed within the interior chamber 66 of the filter housing. In this case, the spacer ring 70 may be welded in abutment with the fail-safe/regenerator device 68 to secure the fail-safe/regenerator 68 unit and to prevent the filter element 28 from moving and contacting the filter housing 62 thereby preventing possible damage to the filter element 28. When the fail-safe/regenerator device 68 is not incorporated with the present invention, then only the spacer ring 70 will be securely mounted within the filter holder interior chamber 66. Alternatively, the fail-safe/regenerator device 68 may be removably mounted within the housing interior chamber 66 with the spacer ring 70 permanently and/or removably mounted within the housing interior chamber 66. The failsafe/regenerator device 68 is provided to help prevent particulate matter from travelling into the clean gas area of the pressure vessel if a filter element fails, is damaged or breaks. Additionally, the fail-safe regenerator 68 will heat the back pulsed gas which is generally cooler than the gas stream to prevent the filter elements 28 from enduring thermal fatigue or cracking.

A thick walled monolithic candle filter body 28 typically comprises an outside diameter of approximately 60 mm and an inside diameter that ranges from about 30 mm to about 44 mm. The filter housing 62, annular spacer ring 70, and fail-safe/regenerator device 68 are made of a material that can withstand the relatively high temperatures that are reached in a particular system and possess the strength and durability to support the filtering components, preferably a high temperature metal material, such as 310 stainless steel.

Figure 5:
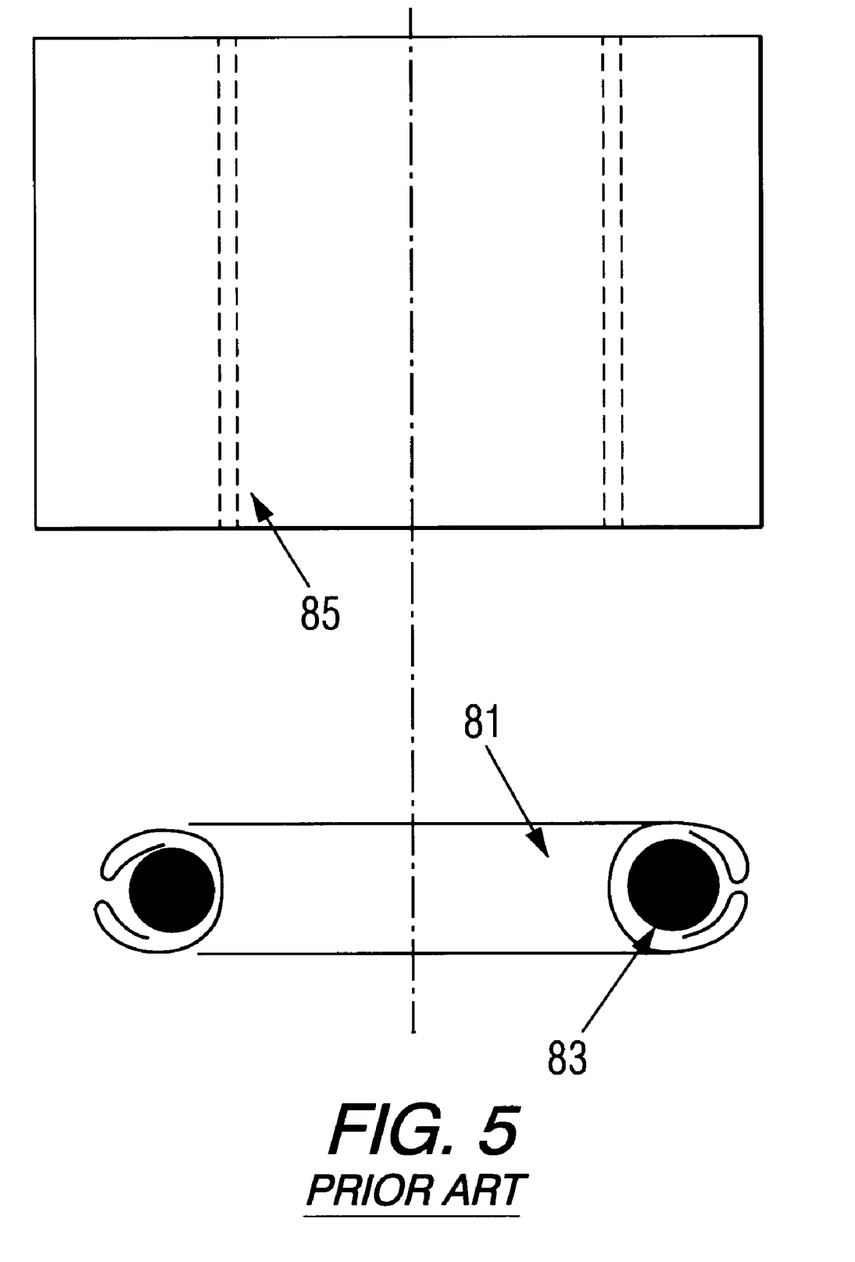
FIG. 5 is a sectional view of a conventional, prior art two component gasket having a central, encased annular fiber construction.

The gaskets 72, 74 and 76 are individual components that are separate and apart from the filter housing 62. The gasket sock 72 or sleeve is preferably made from high temperature ceramic fibers that are woven or braided into a circular sleeve. The shape and size of each gasket 72, 74, 76 must be large enough to be positioned on or around the candle filter 28 to provide an adequate particulate barrier seal to prevent leakage of unfiltered, dirty gas containing fine particulates into cleaned, filtered gas. More particularly, the top gasket 74 and bottom gasket 76 are preferably made completely of a single component braided or woven oxide based fabric shown in FIG. 4A and 4B, unlike the prior art gaskets shown in FIG. 5 that encases continuous or chopped oxide fiber, compliant mat 83.

All three gaskets are preferably made from an aluminum borosilicate, for example $9Al_2O_3:2B_2O_3$ with $SiO_2$ present in an amorphous phase. A very useful material is made of 62 wt. % $Al_2O_3$, 14 wt. % $B_2O_3$ and 24 wt. % $SiO_2$ (sold under the Tradename Nextel™ 312 fiber sold commercially by 3M). The maximum continuous use temperature is about 1200° C. The sleeve 72 is about 15 cm. to 18 cm. long with a 6 cm. to 7.4 cm. inside diameter and a 1 mm. to 3 mm. wall thickness. The outside diameter ("OD") for the upper and lower gaskets ranges from about 7 cm. to 8 cm. with an inside diameter ("ID") of about 3.6 cm. to 4.6 cm. When compressed, the thickness of the upper and lower gaskets is about 5 mm.

The gasket sock or sleeve 72 is positioned around the outer surface of the filter flange 61 and extends partially down the length of the filter body 28. The top compliant gasket 74 is positioned along the top surface 18 of the filter flange to provide a compliant cushion and particulate matter barrier seal between the filter housing 62 and its spacer ring 70 and filter flange top 18. The bottom compliant gasket 76 is positioned at the base of the filter flange over the sleeve 72, as shown in FIG. 3. The bottom compliant gasket 76 provides a compliant cushion and particulate barrier seal between the filter body 28 and filter housing 62 and the cast nut 78. The assembled filter holder and gasket assembly 60 is then coupled to the tube sheet 52 shown in FIG. 2. All three gaskets 72, 74 and 76 provide a particulate matter barrier seal.

Referring now to FIGS. 4A and 4B, the two preferred configurations of top and/or bottom compliant gaskets 74 and 76, respectively, is shown. FIG. 4A shows a two end rolled double spiral "lapped" gasket 71, made from long sheet or sleeving 73 with turning folds shown as dotted lines. FIG. 4B shows a single rolled single spiral gasket 75, made from long sheet or sleeving 77 with turning folds shown as dotted lines. The sheet or sleeving 73 and 77 is made of braided or woven ceramic, for example $x(Al_2O_3)\cdot y(SiO_2)$, where x and y=1–10. Although dimensionally similar to the standard prior art mat-filled top and middle gasket 81 shown in FIG. 5, where a separate component interior ceramic core of ceramic mat filler 83 is used in addition to the outer braided sleeving 85 using a separate mat filler 83 and the short woven or fabric braided sleeving or sheet 85, with turning folds shown as dotted lines.

The lapped or rolled gasket of this invention utilizes the woven or braided sleeving material as a substitute for the interior continuous or chopped mat. The lapped unit 71 is formed via turning both edges of the sleeving material 73 at an appropriate width to achieve the required dimensional tolerances of the defined gasket geometry. A series of sleeving layers results, with the number of lapped layers being defined by the required compliance and dimensional tolerances of the unit. The unit is subsequently stitched along its outside diameter forming the top or bottom compliant lapped gasket. Alternately the rolled gasket 75 consists of turning only one edge of the sleeving material 77 at an appropriate width to achieve the required compliance and dimensional tolerances of the defined gasket geometry. A series of sleeving layers results, with the number of rolled layers being defined by the required compliance and dimensional tolerances of the unit. The unit is subsequently stitched along its outside diameter, forming the top or bottom compliant rolled gasket. The materials used in the construction of either the lapped or rolled gaskets are high temperature, woven or braided, ceramic fabrics, yarns, or threads as described previously. These include, but are not limited to materials sold under the tradename Nextel™ 312, 440, 550, 610 and 720, and the like.

Figure 6:
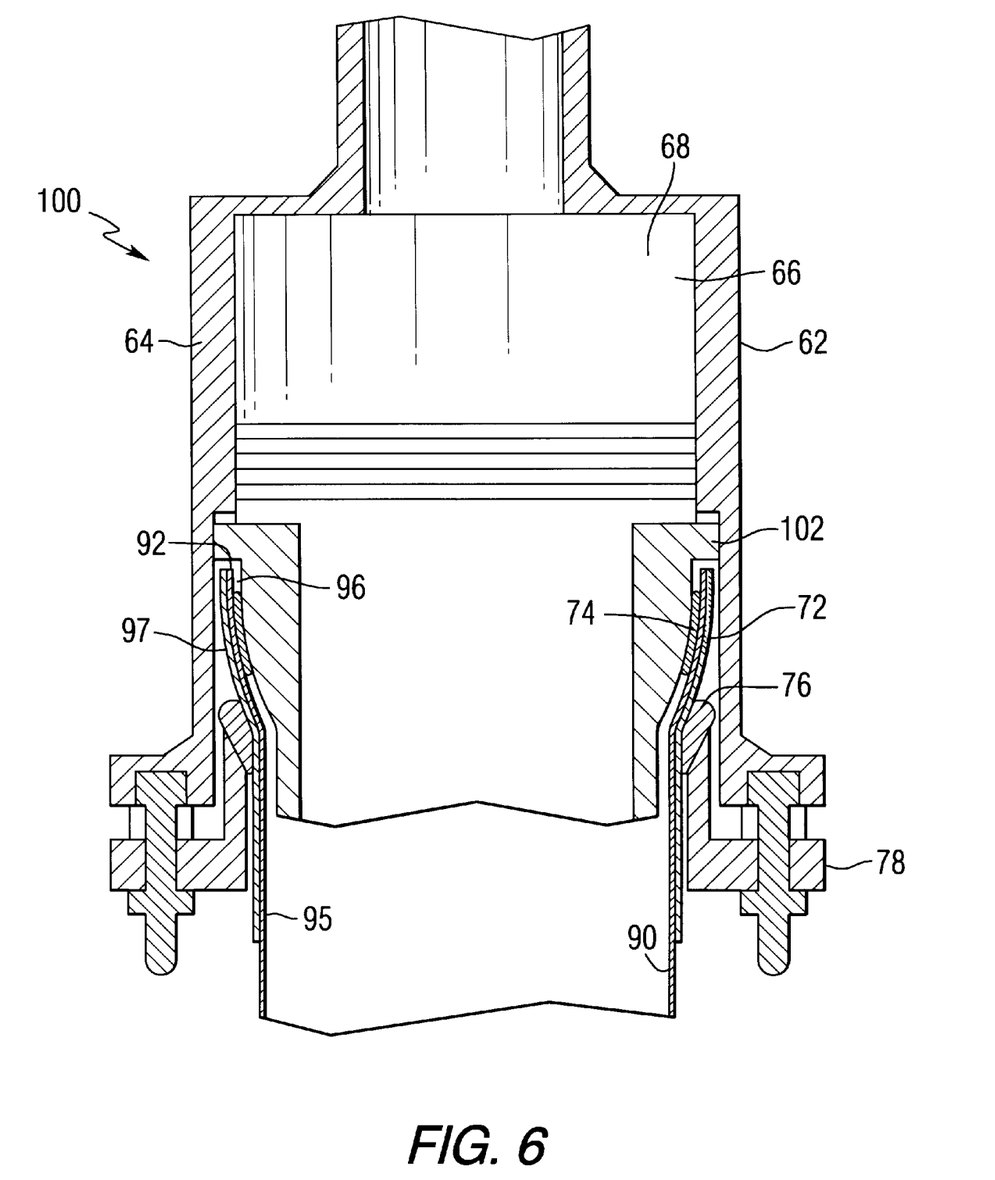
FIG. 6 is a sectional view of an alternate filter holder and gasket assembly employing a thin-walled composite hollow candle filter.

Referring next to FIG. 6, a preferred embodiment of the present invention is shown, employed with a thin walled composite candle filter 90. The filter holder and gasket assembly 100 comprise the filter housing 62, fail-safe/regenerator device 68, gaskets 72, 74, 76, and cast nut 78 as that described above for the thicker monolithic ceramic and/or porous metal candle filter holder and gasket assembly 100. The annular spacer ring 102 is, however, designed differently than that employed with thick walled filter elements because of the different dimensions possessed by the thin wall composite filter 90.

The thin wall composite filter element 90 has a hollow body having two opposing ends, one end being a flange open end 92 and the other being a closed end (not shown). The filter body 90 has an inner diameter surface and an outer diameter surface. The flange end 92 has an inner surface and outer surface. Thin-wall composite filters are typically comprised of fibers and a ridgidized matrix made of SiC, aluminum, or aluminate silicate. These filter elements are porous and have a reduced sidewall thickness ranging from about 1.0 mm to about 5.0 mm. The composite filter flange wall thickness and body are thinner than those of conventional ceramic filter element flange.

Additionally, top compliant gasket 74, and bottom gasket 76 are designed to fit along and within a thin-walled composite filter flange area and along the outer surface of the candle filter at the base of the flange, respectively, to provide a primary seal to prevent particulates from passing from the contaminated gas stream side to the cleaned gas side. The gasket sleeve 72 is formed to be positioned around the candle body top flange outer surface 97 and a portion of the filter body outer surface 95 and to fill the space between the filter body 95 and the housing interior 66 and provide a seal therebetween. The top or topmost compliant gasket 74 is formed to be positioned adjacent to the thin wall filter flange interior surface 96 and to provide a compliant cushion and particulate barrier seal between the filter flange inner surface 96 and an annular spacer ring 102. The bottom or bottommost gasket 76 is formed to be positioned between the candle body top flange outer surface 97 and filter housing interior 66 to provide a particulate barrier seal between the filter flange outer surface 97 and filter housing interior 66. As mentioned previously, at least one of the gaskets shown and described in FIGS. 4A and 4B will be utilized in the assemblies shown in FIGS. 3 and 6.

The present invention may be embodied in other forms without departing from the spirit or essential attributes thereof, and accordingly, references should be made to the appended claims, rather than to the foregoing specification as indicting the scope of the invention.

EXAMPLE

In order to demonstrate the functionality of either the lapped or rolled gasket concept, a set of lapped top and middle gaskets was manufactured, installed above ceramic candle filters, and tested in high temperature pressurized fluidized bed combustion "PFBC" simulator test facility. Testing was conducted at temperatures of about 850° C. (1550° F.), and about 10 atmospheres (150 psig), under steady state, pulse cycling, and thermal transient conditions for about 65 hours. Upon completion of testing and removal from the system, excellent performance and viability of the lapped gasket set were identified. The newly designed lapped gasket performed comparably to that of the prior art mat-filled gasket concept by: preventing dust penetration into the clean gas passage; retaining the required complaint thickness, having a uniform thickness which established uniform load transfer along the entire unit, and remaining intact, that is, absence of fraying, tearing, etc. upon completion of testing.

As shown by the example, the lapped or rolled gasket concept assures the manufacture of an integral unit which eliminates the potential of the prior art gaskets for loss of the internal continuous or chopped mat during process operation; results in production of a unit with a more uniform thickness, ultimately leading to a more uniform applied load across the gasket during process operation; eliminates the need to purchase, assure product availability, inventory, and process and assembly of units comprised of two materials; facilitates ease of manufacturing and quality assurance for a single material of construction; and potentially reduces materials, labor, and construction costs.

What is claimed is:

1. A candle filter holder and gasket assembly for holding a candle filter element within a hot gas cleanup system pressure vessel, the filter element including a body having two opposing ends, one defining a flange open end and the other defining a closed end; the filter element body having a smaller inner diameter surface and a larger inner diameter surface, said candle holder and gasket assembly comprising:

a. a filter housing, said filter housing having a peripheral sidewall, said sidewall defining an interior chamber;

b. at least one compliant gasket separate and apart from the filter housing, said compliant gasket positioned next to the filter element and effective to provide a seal between filtered gas and unfiltered gas and to cushion the filter element; and c. means for coupling the filter element, filter housing, and gaskets within the pressure vessel; where the at least one compliant gasket has a circular sleeve construction that consists of a single element made of a braided or woven sheet or sleeving rolled within itself to form a configuration selected from (1) a single end rolled single spiral or (2) a two end rolled double spiral, both constructions with no separate center element, said gaskets consisting of ceramic sheet or sleeving.

2. The assembly of claim 1, where the assembly contains an individual top complaint gasket and an individual bottom compliant gasket and where at least one of the gaskets has a construction that consists of a single element made of a braided or woven sheet or sleeving rolled within itself to form a configuration selected from (1) a single end rolled single spiral or (2) a two end rolled double spiral, both constructions with no separate center element.

3. The assembly of claim 2, where the top gasket has a construction that consists of a single element made of a braided or woven sheet or sleeving rolled within itself to form a configuration selected from (1) a single end rolled single spiral or (2) a two end rolled double spiral, both constructions with no separate center.

4. The assembly of claim 2, where both the top gasket and bottom gasket have a construction that consists of a single element made of a braided or woven sheet or sleeving rolled within itself to form a configuration selected from (1) a single end rolled single spiral or (2) a two end rolled double spiral, both constructions with no separate center element.

5. The assembly of claim 1, where the at least one complaint gasket consists of a single end rolled single spiral configuration, with no separate center element.

6. The assembly of claim 1, where the at least one complaint gasket consists of a two end rolled single spiral configuration, with no separate center element.

7. A filter holder and gasket assembly for holding a thick walled candle filter element within a hot gas cleanup system pressure vessel, the filter element including a body having two opposing ends, one defining a flange open end and the other defining a closed end; the flange open end having a top surface, an outer flange diameter surface and a flange inner diameter surface; the filter element body having a smaller inner diameter surface and a larger inner diameter surface, said filter element body inside diameter surface being equal to or less than the flange inner diameter surface; said filter holder assembly comprising:

a. a filter housing, said filter housing having a peripheral sidewall, said sidewall defining an interior chamber;

b. a generally annular spacer ring within said interior chamber;

c. at least one individual gasket sock separate and apart from the filter housing, said gasket sock formed to be positioned completely around the filter flange outer diameter surface and at least a portion of the filter body to provide a seal between the filter flange outer diameter surface, a portion of the filter body, and said filter housing;

d. at least one individual top compliant gasket separate and apart from the filter housing, said top compliant gasket formed to be positioned on the filter flange end top surface for providing a seal between said spacer ring and the filter flange top surface;

e. at least one individual bottom compliant gasket separate and apart from the filter housing, said bottom gasket formed to be positioned between said gasket sock and said filter housing sidewall to provide a seal between a portion of the filter body and said filter housing sidewall; and f. a means for coupling the filter element, filter housing, and gaskets within the pressure vessel; where both top and bottom gaskets have a circular sleeve construction which consists of a single element made of a braided or woven sheet or sleeving rolled within itself to form a configuration selected from (1) a single end rolled single spiral or (2) a two end rolled double spiral, both constructions with no separate center element said gaskets consisting of ceramic sheet or sleeving.

8. The assembly of claim 7 where said spacer ring is welded within said housing interior chamber.

9. The assembly of claim 7, where both top and bottom gaskets have a construction which consists of a single element made of a braided or woven sheet or sleeving rolled within itself to form a single end rolled single spiral, with no separate center element.

10. The assembly of claim 7, where both top and bottom gaskets have a construction which consists of a single element made of a braided or woven sheet or sleeving rolled within itself to form a two end rolled double spiral, with no separate center element.

11. A filter holder and gasket assembly for holding a thin-walled candle filter element within a hot gas cleanup system pressure vessel, the filter element including a body having two opposing ends, one defining a flange open end and the other defining a closed end; the flange open end having a relatively thin wall outer diameter surface and flange inner diameter surface, said flange smaller inner diameter surface having a smaller diameter than said outer flange diameter; the filter element body having a smaller inner diameter surface and a larger outer diameter surface, said filter holder assembly comprising:

a. a filter housing, said filter housing having a peripheral sidewall, said sidewall further defining an interior chamber;

b. a generally annular spacer ring within said filter housing interior chamber, said spacer ring further including a top surface and a bottom surface;

c. at least one individual gasket sock separate and apart from the filter housing, said gasket sock formed to be positioned completely around the thin wall filter flange outer diameter surface and at least a portion of the filter body to provide a seal between the filter flange outer diameter surface, a portion of the filter body, and said filter housing;

d. at least one individual top compliant gasket separate and apart from the filter housing, said gasket formed to be positioned adjacent to the inner surface of the thin wall filter element flange to provide a seal between the thin walled candle filter flange inner diameter surface and the spacer ring;

e. at least one individual bottom compliant gasket separate and apart from the filter housing, said bottom gasket formed to be positioned between said gasket sock and said filter housing sidewall to provide a seal between the filter body and said filter housing sidewall; and f. a means for coupling the filter element, filter housing, and gaskets within the pressure vessel; where both top and bottom gaskets have a circular sleeve construction which consists of a single element made of a braided or woven sheet or sleeving rolled within itself to form a configuration selected from (1) a single end rolled single spiral or (2) a two end rolled double spiral, both constructions with no separate center element, said gaskets consisting of ceramic sheet or sleeving.

12. The assembly of claim 11 wherein said spacer ring is welded within said filter housing interior chamber.

13. The assembly of claim 11, where both top and bottom gaskets have a construction which consists of a single element made of a braided or woven sheet or sleeving rolled within itself to form a single end rolled single spiral, with no separate center element.

14. The assembly of claim 11, where both top and bottom gaskets have a construction which consists of a single element made of a braided or woven sheet or sleeving rolled within itself to form a two end rolled double spiral, with no separate center element.

* * * * *